Aug. 25, 1959 M. A. RUDNER 2,901,529

HERMETIC SEAL TERMINALS AND METAL TO PLASTIC BONDING

Filed Aug. 22, 1951

INVENTOR.

Merritt A. Rudner

BY Julius E. Foster 2,901,529

HERMETIC SEAL TERMINALS AND METAL TO PLASTIC BONDING

Merritt A. Rudner, Camden, N.J., assignor to United States Gasket Company, Camden, N.J., a corporation of New Jersey Application August 22, 1951, Serial No. 243,073

4 Claims. (Cl. 174—152)

This invention relates to terminals, and particularly to terminals which serve also to close and to seal a container for an electrical device or component.

In the case of many electrical devices it is desirable to enclose them to protect them from dirt and moisture, and other harmful ambient conditions. The moisture particularly can sometimes be harmful, and may enter a device or its neighborhood due to alternate expansion and contraction resulting from the heating and cooling during alternate cycles of operation.

Moreover, when used in aircraft, electronic components and electric circuits encounter ambient conditions that vary from normal sea-level atmospheric pressure to rarefied pressures at high elevations. In such rarefied atmospheres, voltages which may be safely employed at sea-level or at low elevations, may result in voltage breakdown trouble. In order to eliminate such voltage breakdowns, many electronic components for military use are encased in hermetically sealed containers or cans. Since electrical connections must be made to the components through the wall of the contanier, the terminals for that purpose must be made through insulating elements that must also serve to maintain a hermetic seal at the region of the container wall where the terminal extends through the insulating element and where that element is supported on or connected to the container.

Some use has already been made of glass beads and discs as sealing "headers" for such through terminals. However, they have certain disadvantages due to their brittleness and consequent critical inability to adjust themselves to compensate for variations in tolerances or pressures that occur during manufacture, especially in machine-assembly operations.

The articles contemplated by this invention have at least one metal-bondable surface having a composition of high metallic content and containing a halogenated compound, either polytetrafluoroethylene or trifluorochloroethylene as a binding material.

An object of this invention, therefore, is to provide hermetic-seal terminals and headers, to serve as insulated terminals for electrical components in hermetically sealed containers, and to maintain a hermetic seal where the terminal connection to the component extends through a container wall.

Another object of this invention is to provide a hermetic seal terminal which has substantial resiliency and adjustability to adapt itself to sealing operations where manufacturing variations in pressures or dimensions are encountered.

Another object of this invention is to provide a sealing terminal having a body of insulating material and metallic surface which may be soldered to a container surface, and which will be able to withstand any temperatures necessarily impressed during the soldering operation.

Another object of this invention is to provide a sealing terminal of a fluoro-carbon resin body such as tetrafluoroethylene or trifluorochloroethylene having a metallic surface-layer, for solder sealing to a desired external surface to support the terminal, and to seal the surface at which the terminal is supported.

Another object of this invention is to provide a top-sealer for a hermetically sealed electronic or electrical component requiring several terminals for connections to external circuits.

Figures 1, 2, 3, 4, 5, 6, 7:
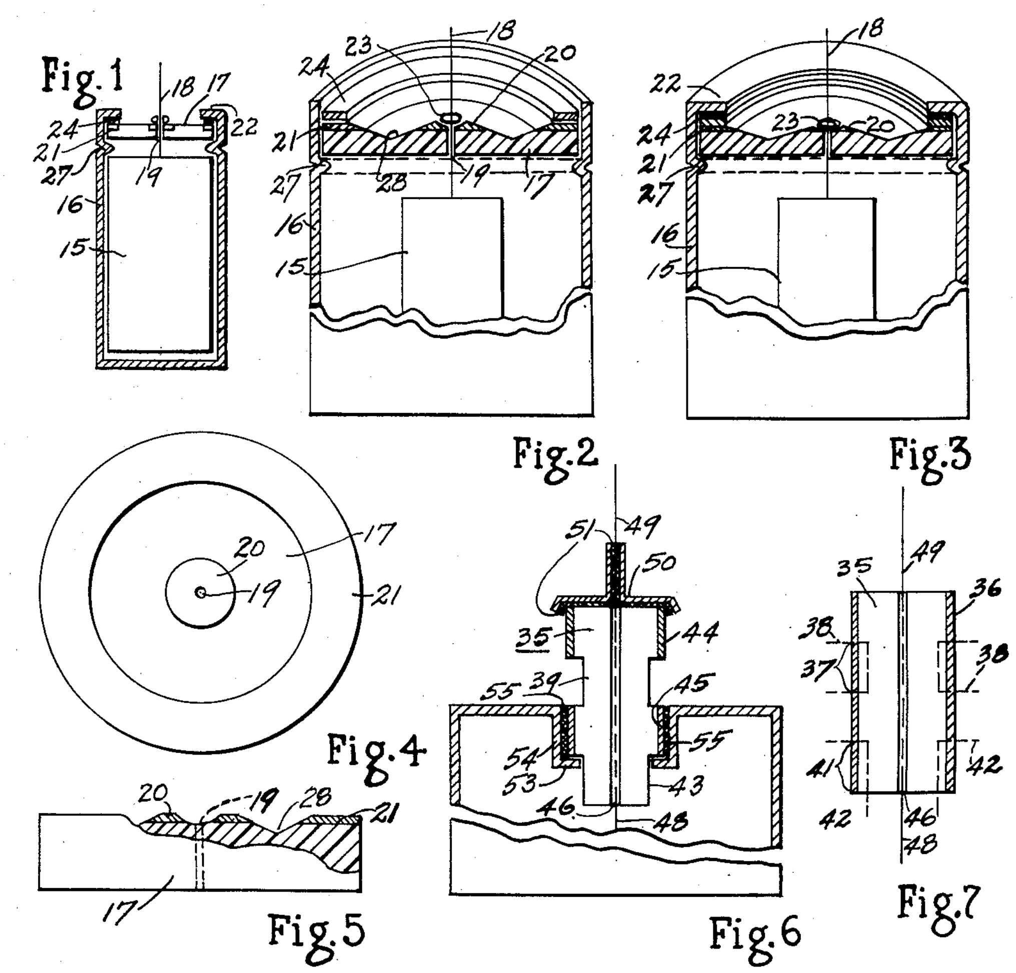
Figure 1 is a schematic view of an electronic component as disposed in a can with a hermetic sealing cap, that supports a terminal for the component.
Figure 2 is a side view, partially in elevation and partially in section with the sealing elements shown in schematic perspective, as disposed before the sealing operation is performed.
Figure 3 is a view similar to that shown in Fig. 2, with the sealing elements shown in sealing position after the top rim edge of the can has been peened over to engage the sealing elements and seal the cap.
Figure 4 is a plan view of a sealing disc made in accordance with the principles of this invention.
Figure 5 is a side view, partially in elevation and partially in section, of the sealing disc of Fig. 4 with a portion broken away to show the disposition of the metal sections of the disc.
Figure 6 is a side elevational view of a portion of a can with a modified form of sealing terminal.
Figure 7 is a longtitudinal sectional view, of a length of metallized Teflon rod, showing the metallized periphery before two spaced ring portions of the peripheral surface are removed to provide the conducting and insulating portions as shown in the finished sealing terminal shown in the assembly of Fig. 6.

The general principle of this invention involves the provision of a body of insulating material having a portion of the body metallized and treated to have an integral metallic layer. A further feature of this invention is the provision of a sealing cap, in various forms, having an opening through which a terminal wire from an electronic component may be easily threaded in order to bring that wire out to provide an external terminal for the electronic component, without requiring soldering operations that were heretofore required with such a device. A specific feature of this invention is, of course, the provision of a base or body of a halogenated ethylene for the sealing element. The body of the halogenated ethylene material is formed with a portion of the body loaded with a metallic content so that loaded portion of the body will be an integral part and have a metallic surface that will not tend to strip from the surface of the body, as is the usual experience in connection with metallic layers or deposits on an insulating surface to which the metallic layer is not cohesively joined.

The various fluoro-carbon resins, as halogenated ethylenes, are available commercially in raw powder form, some of which are presently known by the trade names of Teflon, Kel-F, and Fluoro-Ethelene and whose chemical names are polytetrafluoroethylene and trifluorochloroethylene.

The method of treating a halogented ethylene body to incorporate an integral metallic portion, so that a metal surface will be available at a selected area of the body, is generally described and claimed in my co-pending application, Serial No. 221,197, filed April 16, 1951, and assigned to the assignee of this application. Briefly, a mixture of the halogented ethylene powder and a selected finely ground powdered metal, in this case powdered copper, is layered over a base quantity of pure powder, with the metal-and-powder mixture disposed where the ultimate metal surface is desired. The entire quantity of powder thus formed and arranged is then compressed to about one-fourth its initial height so the final volume will constitute a body of the desired element in its desired shape and volume. The body as thus compressed is then subjected to a sintering temperature of about 700 degrees Fahrenheit, to heat the entire body, for an interval dependent on the volume, and is then permitted to cool to normal temperature.

The important feature at this point is that a body of pure halogenated ethylene is now integrally bonded in a unified body structure, with a portion of its body containing a preponderant portion of metallic content, with the minor proportion of halogenated ethylene serving as a cohesive bonding medium with the pure halogenated ethylene body, so that the surface of the halogenated ethylene body is so preponderantly metal that a metal layer may be bonded thereto, for electrical connection, for mechanical sealing to withstand vacuum, and for mechanical structural support.

Although, in principle, the gradual variation and increase of metallic content provides an ideal disposition of the metallic content, a commercially satisfactory structure is obtained where the proportion of the mixture is changed in two steps, instead of being varied continuously and gradually. Thus, a body of halogenated ethylene molding powder may have superimposed thereon a layer of a halogenated ethylene-copper powder mix in which the copper content may vary within the range from 30 to 45 percent, by weight, and then a second layer of a mixture added, in which the copper content is 70 percent or more, by weight. For convenience the copper content may be referred to as 40% and 70% mixtures, but those percentages are not in themselves critical, since the proportions of the respective mixes may be varied, and a firm cohesive bond obtained in the body and at the surface. Utilizing a suspensoid of a halogenated ethylene, it is possible to obtain a mixture with a copper content running 80% or more.

After the metallized body has cooled, the metallized portion is then covered with a metallic layer by any suitable method of deposition, which then assures a continuous monolithic layer of metal on the metallized portion of the body, that will accept a soft metal connection, such as solder, for the use indicated herein and for analogous uses. For example, a metallized layer of the body, thus formed, is preferably covered with a flash deposition of silver, which may then be covered, if desired, with a layer of tin, in order that solder will flow freely in the formation of a soldered connection to that metal or silver surface.

As shown in Figure 1, an electronic component, such as a condenser 15, is enclosed in a metallic can 16, which is hermetically sealed by an insulating disc 17. A solderable member shown as a conductor 18, from the component 15, extends out through the can to provide an external terminal which may be connected to an external circuit. The other terminal of the component 15 is grounded on the enclosing can 16. The sealing disc 17 consists of a flat annular body of the halo derivitive material having a central metallized annular ring section 20, rimming the opening 19, and a concentric metallized annular border section 21, over which a flash layer of silver has been deposited, and then tin, to provide a metallic surface to which a solder connection may be easily and readily made.

A thin narrow preformed solder ring 23 is slipped over the wire conductor 18 and seats against the central metallized ring 20. A similar solder preform 24 is seated on the metallized border ring 21, and presses against the inner surface of the can 16 just below the top edge or rim 22, which is subsequently flanged over to engage the preform 24 and press it against the border ring 21 of the disc 17. An inwardly directed bead 27 on the can 16 serves as a seating shoulder for the Teflon disc 17, to hold it during the assembly operations. The can may be otherwise filled with a fluid, liquid, or gas, to immerse the electronic component, which is shown in exaggerated spacing from the can.

In Figure 2, an enlarged semi-perspective view is shown of the top of the can and of the sealing disc. The preformed solder ring 23 is shown applied over the threaded wire 18, and the solder preform 24 is disposed adjacent the rim of the can before the rim is flanged over to engage the preform 24. The spacing between the central ring 20 and the border ring 21 on the disc provides sufficient insulation between them. For additional surface separation, a shallow annular groove 28 of shallow-V shape may be provided as shown, or, alternatively, a ridge of inverted-V shape may be formed to separate the two rings 19 and 20, or in the space that separates the two rings.

The central metallic ring 20 is provided with a symmetrical depression which serves to localize and confine a globule of solder that will be formed when the preformed solder ring 23 is melted to establish a solder connection between the metal ring 20 and the wire conductor 18.

After the sealing disc 17 and the preforms 23 and 24 are placed in position, the top rim 22 of the can is flanged over, as in Fig. 3, to engage and press down on the annnular border preform 24, so the solder, when heated, will melt and form a wetting seal between the flange 22 and the metallic ring 21 on the disc seal 17. In order to melt the two solder preforms, the entire can, as assembled in Fig. 3, is passed through a heat zone, which may be, for example, a high-frequency field of sufficient energy content to heat the two preforms 23 and 24 to their melting temperatures to establish the desired soldering connections. When the center preform ring 23 is melted, it forms a globule that then collects in the concave crater of the center ring 20 to establish a solder connection between that center ring 20 and the wire 18.

At the same time, the solder preform 24 is melted and forms a solder bond between the flanged rim 22 of the can, and the metallized border ring 21 on the disc seal 17. To aid this operation, the inner surface of the rim edge of the can may be tinned before it is flanged over.

For those applications where it is desired to evacuate the can containing the electronic component before the can is hermetically sealed, the arrangement as provided herein permits simple evacuation of the can and then a sealing operation, by evacuating the can and heating the solder preforms at the same time, or the arrangement permits the border solder preform 24 to be melted first to establish a seal at the rim and then the can may be exacuated through the central opening of the disc, after which the small solder preform ring 23 may be sealed and melted to establish the final seal to hermetically seal the can.

The general construction of the sealing disc is shown in more detail in Figures 4 and 5. The diameter of the actual disc represented by these two figures is ⅝ of an inch, and the thickness is about ⅛ of an inch, with the diameter of the inner metallized ring 20 about ⅛ of an inch and the width of the border ring 21 slightly under ⅛ of an inch. The thickness of the two metallic layers 20 and 21 in the finished disc is about 0.03 inch.

In Figure 6 is shown another modification of a sealing terminal for a similar can for an electronic component. In this case, the sealing terminal 35 is made from rod stock of Teflon having a continuous thin covering metallic section 36, that is metallized in accordance with the procedure previously described, where the peripheral portion is formed from a combination powder-and-copper mix, so the finished rod after being compressed and sintered at the usual sintering temperature referred above, is available in finished rod form with a continuous metallic surface, as shown in Figure 7.

A length of such rod stock is then machined in a screw machine, in which a short length of the rod, as shown in Figure 7, is machined to remove a peripheral ring portion 37 within the limits of the broken dash lines 38; and a similar ring portion 41 is removed within the limits outlined by the broken dash lines 42. The short section of the rod is then drilled along its axis to provide an axial passage 46 thru the length of the piece being machined, to accommodate a terminal wire from the component 15, and the finished unit, after being so machined, has the shape and form of the assembled unit 35 shown in position on the can in Figure 6.

A wire 48 from the component to be housed in the can is threaded through the axial passage 46 to bring out a short length of wire 49 beyond the upper edge of the plastic unit 35.

After the machining of the plastic unit, the two metallized peripheral rings are left, separated and insulated by the Teflon section 39 between them. Those two remaining metallized ring portions 44 and 45 may then be utilized to provide the sealing connections for the terminal and the can.

In Figure 6, a rigid metal ferrule 50, to serve as a terminal, is seated on an annular solder preform 51 disposed to cover the top of the plastic unit 35. The preform 51 serves to establish a metallic solder connection between the ferrule terminal 50 and the short wire section 49 and the peripheral metal ring 44. The rim of the terminal 50 is flanged downwardly around the metallized ring 44 to confine the solder preform 51, when the preform is later heated to molten condition, to assure a proper mechanical connection between that metallized ring 44 and the terminal 50, to support the terminal 50.

The plastic unit, after being threaded over the wire 48, is seated on an annular shoulder or seating portion 53 of the can, with the metallized ring 45 closely spaced from a neck portion 54 to which the metallized portion is subsequently electrically connected by a solder preform, originally consisting of a thin cylinder 55 disposed between the metallized portion 45 and the neck 54. The two preforms 51 and 55 are heated to melting temperature, in any suitable manner, such as the method, suggested above, of passing the assembled can and its sealing terminals thru a heat zone, such as a high frequency induction field. After the entire assembly is passed thru the heat zone, the molten preforms cool and solidify and establish permanent connections and hermetic seals between the associated surfaces. Where the can is to be evacuated, that operation may be conveniently performed just prior to the sealing operation, or simultaneously with the sealing operation.

Figure 8:
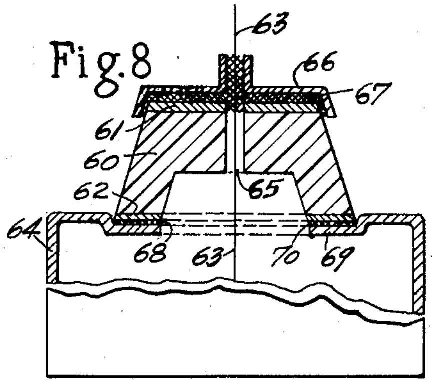
Figure 8 is a vertical sectional view of the top part of an electronic container, and another modification of a hermetic sealing terminal made in accordance with the principles of this invention.

In Figure 8 is shown a further modification, in which a sealing disc 60 of a halogen derivative of ethylene, such as tetrafluoroethylene or trifluorochloroethylene is a frustoconical and cup-shaped, having a top annular metallized portion 61 and a bottom annular metallized ring portion 62.

A wire 63 from the electronic component in the can 64 extends up thru a central axial opening 65 into a ferrule 66 to serve as a terminal cap which will be soldered to the wire 63 and to the upper metallized portion 61 by a solder preform 67, in the manner already disclosed for the other modifications. Similarly, the bottom annular metallized ring 62 will be soldered to a seating shoulder 69, on the can 64, by means of an annular solder preform 70. Evacuation of the can prior to sealing may be accomplished as previously described.

Figures 9, 10:
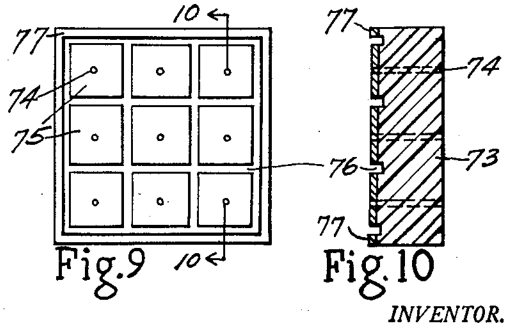
Figure 9 is a plan view.
Figure 10 is a sectional view taken along the lines 10—10 in Figure 9, of a multi-terminal header or sealing cap for an electronic component having several terminals that are to be brought out for connections to external circuits.

In the modifications considered in Figures 1 to 8, provision was made for only one wire from the component to an external terminal.

Where the electronic component requires several external terminals, for connection to external circuits, a sealing cap or header 73 is provided as in Figs. 9 and 10, with a plurality of holes 74 for accommodating the number of wires that are to be brought out to external terminals. As shown on the header plate 73, each hole 74 is surrounded by a metallized area portion 75 to which the associated wire may be soldered, by preforms in the manner previously described. The several areas are insulated from each other by an air space 76 between them, and by the insulating nature of the Teflon base. The wires brought through the header may have sufficient rigidity to serve as self-terminals, to which external circuit conductors may be directly soldered, or, in case of fine wires from the component, rigid ferrules like that in Figure 6 may be utilized as cap terminals for each such fine wires. One ferrule is disposed over and around each wire, to be soldered to the wire and to be anchored to the metallized area 75 immediately surrounding that wire. Each such metallized area may be formed with a glouble-retaining crater like that in Figure 5.

A metallized border 77 is shown provided to permit a sealing solder connection between the header 73 and the can in which the component will be disposed. The border may be provided on the upper surface to permit a sealing connection to be made to the can in a manner similar to that shown in Fig. 3, or the border may be provided on the under surface of the header 73 to permit a sealing connection to be made similar to that in Figure 8, depending upon the type of can to be used for the component. Similarly, the peripheral edge of the header plate 73 may be metallized to permit the formation of a sealing connection as in Figure 6, where so desired.

The construction of a sealing terminal as disclosed herein, provides a sturdy supporting body for the terminal, that will withstand mechanical and thermal shock, and that will provide a simple and economical unit for establishing a hermetic seal for a closure. Moreover, it permits and provides a simplified method of assembly that eliminates several operational steps from procedures heretofore required with prior art sealing terminals and headers.

For convenience of illustration and description, the container for the component has been shown and described as a metal can. The container could equally well be a glass vessel having its surface metallized adjacent an opening, to receive a metallized Teflon sealing element, or the container could be of any other non-metallic material having a metallic surface to which a soldered connection may be made. Thus a vessel or jacket of the halogenated ethylene, for example, having a metallized sealing area could be closed and sealed by a sealing unit of the type described herein.

The invention has been discussed, for illustration, as applied to Teflon. It is also applicable to other similar fluorocarbon resins, as halogented ethylenes having similar physical characteristics.

Similarly, the units disclosed herein may be formed to embody individual wire elements for connection at their respective ends to the component and to the external circuit elements.

I claim:

1. A sealing device for a hermetically sealed container, comprising a perforated solid body composed of polymerized material selected from the group consisting of polytetrafluoroethylene and trifluorochloroethylene, said body having at least two flat surfaces and having mixtures of metal particles and said polymerized material disposed only in regions of limited depth directly subjacent said flat surfaces to provide metalized surface portions, a first of said metalized portions being contiguous to the perforation and extending outwardly therefrom along a flat surface of said body, and a second of said metalized surface portions being contiguous to the periphery of one of said flat surfaces and extending inwardly therefrom along said flat surface and terminating in spaced relation with both the perforation and said first metallic portion, the surfaces of each of said metalized surface portions having a high proportion of metal particles relative to said polymerized material with said subjacent regions having smaller proportions of metal particles, the surfaces of said metalized portions being solderable for formation respectively of hermetic seals between said first metalized portion and a solderable member threaded through the perforation and between said second metalized portion and a wall portion of the sealed container, and said body except for said metalized surface portions and said limited subsurface regions thereof comprising only said polymerized material thereby to retain for the body as a whole the resiliency of said polymerized material.

2. The sealing device of claim 1 in which both of said metalized portions are located on the same flat surface of said body and each of which is separated one from the other throughout an intermediate portion of said same flat surface.

3. The sealing device of claim 1 in which in the region between said metalized surface portions said body is provided with a groove which encircles the perforation.

4. The sealing device of claim 1 in which said solid body is cup-shaped with a top annular portion forming one of said flat surfaces and a bottom annular ring portion terminating in the other of said flat surfaces, the radial width of said ring portion being materially less than the radial width of said top portion, the perforation extending through said top annular portion, one of said metalized portions extending along the flat surface of said top portion and the other of said metalized portions extending along said flat surfaces of said ring portion.

References Cited in the file of this patent

UNITED STATES PATENTS

| | | |
|---|---|---|
| 2,284,899 | Hedin | June 2, 1942 |
| 2,297,488 | Luderitz | Sept. 29, 1942 |
| 2,299,772 | Suits | Oct. 27, 1942 |
| 2,306,291 | Alons | Dec. 22, 1942 |
| 2,392,389 | Joyce | Jan. 8, 1946 |
| 2,400,099 | Brubaker | May 14, 1946 |
| 2,431,474 | Gaudenzi et al. | Nov. 25, 1947 |
| 2,434,742 | Hills | Jan. 20, 1948 |
| 2,456,262 | Fields | Dec. 14, 1948 |
| 2,459,193 | Sparks et al. | Jan. 18, 1949 |
| 2,485,691 | Bogese | Oct. 25, 1949 |
| 2,538,808 | Swiss | Jan. 23, 1951 |
| 2,638,523 | Rubin | May 12, 1953 |

FOREIGN PATENTS

| | | |
|---|---|---|
| 923,805 | France | Feb. 24, 1947 |

OTHER REFERENCES

"Institute of Electrical Engineers Proceedings," vol. 97, part 3, January 1950.

UNITED STATES PATENT OFFICE

CERTIFICATE OF CORRECTION

Patent No. 2,901,529

August 25, 1959

Merritt A. Rudner

It is hereby certified that error appears in the printed specification of the above numbered patent requiring correction and that the said Letters Patent should read as corrected below.

Column 1, line 36, for "contanier" read -- container --; column 4, lines 59 and 60, for "exacuated" read -- evacuated --; column 6, line 22, for "glouble-" read -- globule- --.

Signed and sealed this 26th day of July 1960.

(SEAL)
Attest:

KARL H. AXLINE
Attesting Officer

ROBERT C. WATSON
Commissioner of Patents